Jan. 13, 1959    P. R. VAN SITTERT    2,867,808
TOOL FOR CLINCHING HOG RINGS
Filed Dec. 12, 1955    3 Sheets-Sheet 1
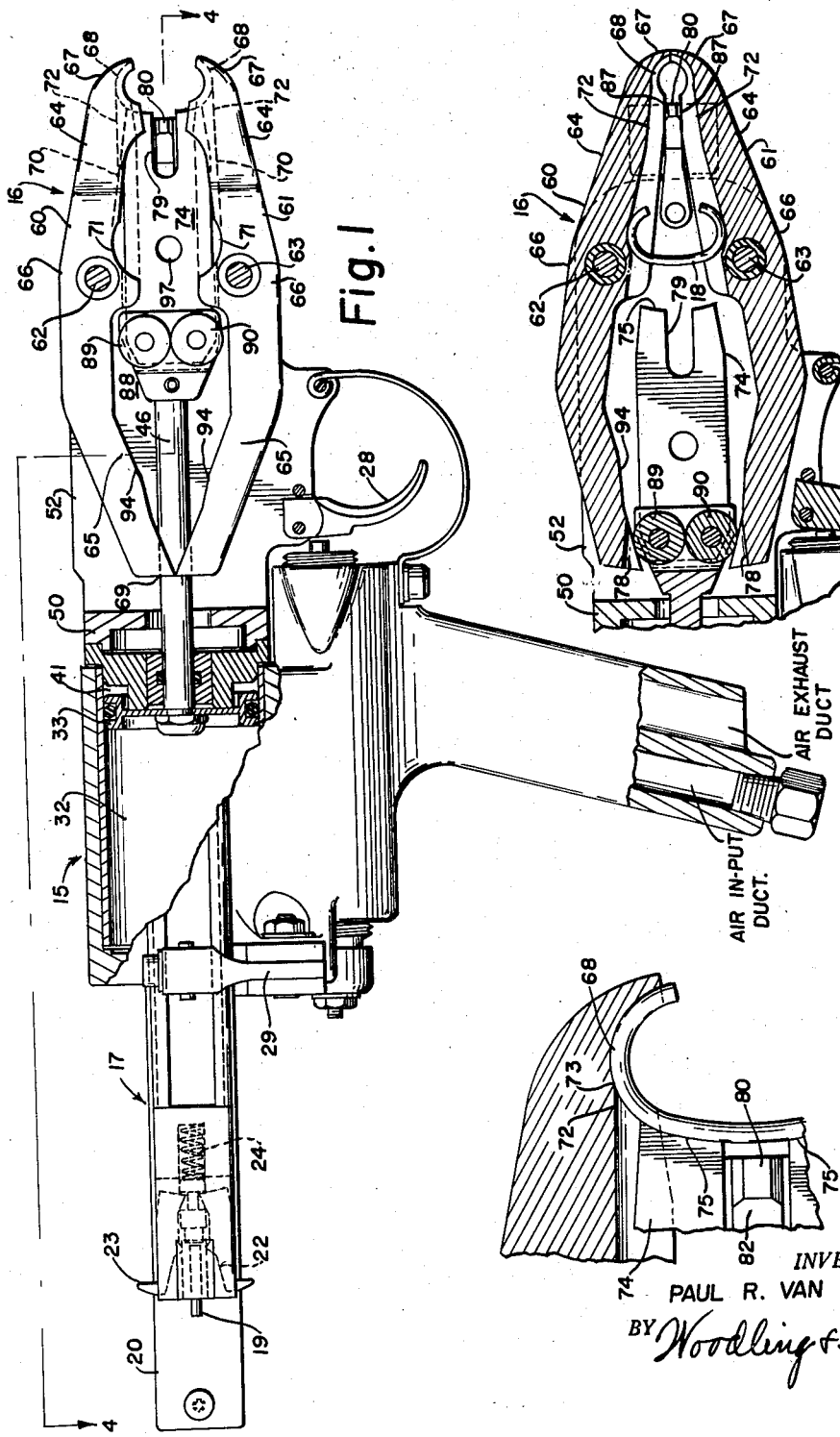
INVENTOR.
PAUL R. VAN SITTERT
BY Woodling & Krost
Atty's.

Jan. 13, 1959
P. R. VAN SITTERT
2,867,808
TOOL FOR CLINCHING HOG RINGS
Filed Dec. 12, 1955
3 Sheets-Sheet 2
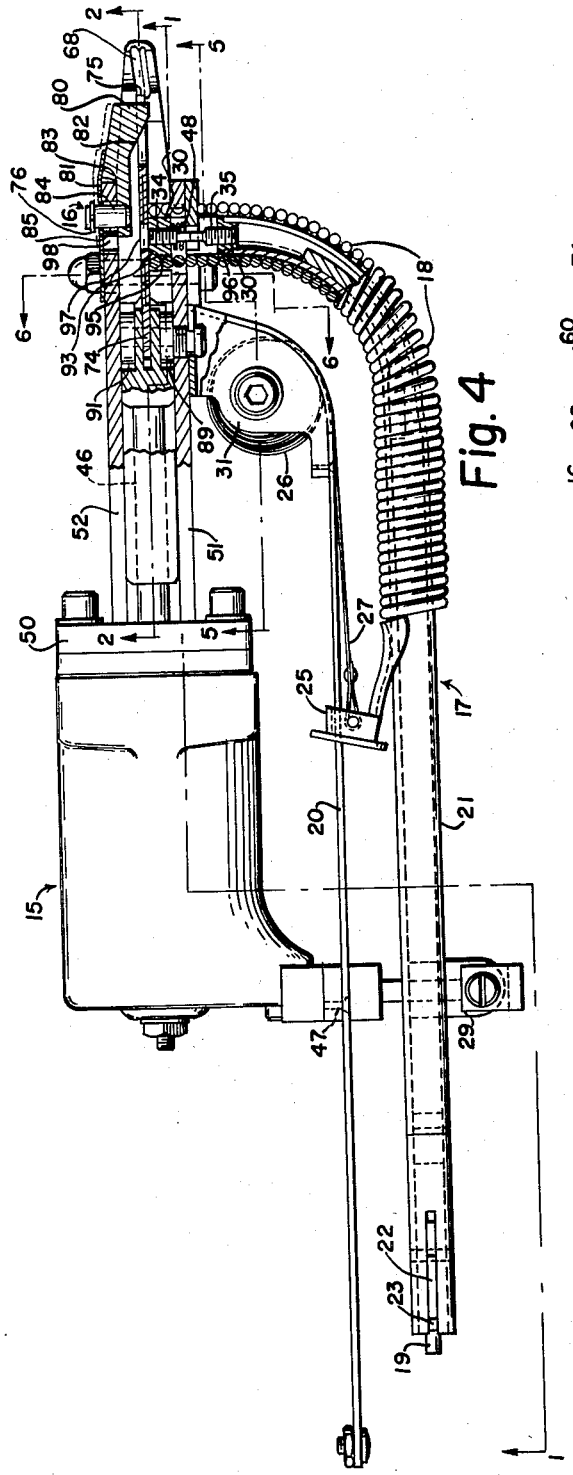
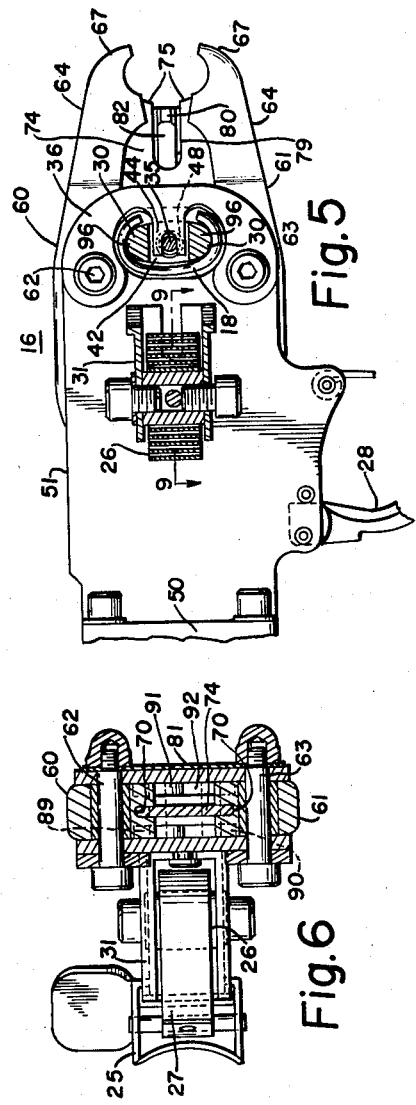
INVENTOR.
PAUL R. VAN SITTERT
BY Woodling & Frost
Atty's.

Jan. 13, 1959 P. R. VAN SITTERT 2,867,808
TOOL FOR CLINCHING HOG RINGS
Filed Dec. 12, 1955 3 Sheets-Sheet 3
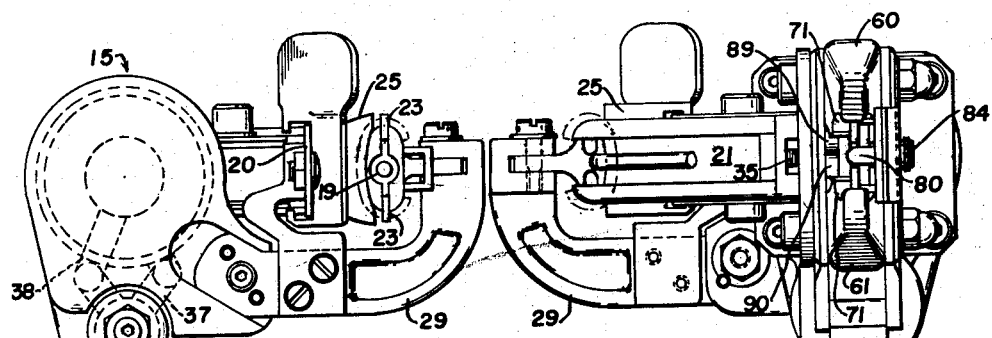
INVENTOR.
PAUL R. VAN SITTERT
BY Woodling & Krost
Atty's.

United States Patent Office 2,867,808
Patented Jan. 13, 1959

---

2,867,808

TOOL FOR CLINCHING HOG RINGS

Paul R. Van Sittert, Cleveland, Ohio, assignor to The Rotor Tool Company, a corporation of Ohio Application December 12, 1955, Serial No. 552,332

5 Claims. (Cl. 1—187)

This invention relates in general to a tool for clinching hog rings and more particularly to a tool which may be actuated by a power motor.

A type of tool to which the invention relates is shown in Patent No. 2,656,539, issued on October 27, 1953. In general, this type of tool comprises a power motor, a clinching mechanism actuated by the power motor and a feed magazine to feed hog rings to the clinching mechanism. This invention constitutes an improvement over the clinching mechanism and the feed magazine shown in the above mentioned patent.

An object of the invention is the provision of a clock-spring to cooperate with the feed magazine for feeding hog rings to the clinching mechanism.

Another object of the invention is the provision in the clinching mechanism of opposed guide grooves which constitute a discharge path through which the rings pass prior to entering the clinching grooves of the jaws, the guide grooves being in longitudinal alignment with the clinching grooves and lying in substantially the same plane.

Another object of the invention is the provision of an anvil member constituting a back-up support to the ring as it is being closed by the clinching jaws.

Another object of the invention is the provision in the clinching mechanism of a back-up anvil disposed to move laterally into the discharge path subsequent to the passage of a ring into the clinching grooves whereby the anvil constitutes a back-up support for the ring as it is being closed by the clinching jaws.

Another object of the invention is the provision of a back-up anvil member disposed along the side of the lever members and resiliently urged to move laterally into the discharge path of the ring, the back-up anvil member having cam surface means engageable by a ring as it passes through the discharge path whereby the anvil member is pushed laterally to one side of the discharge path to admit the ring into the clinching grooves of the jaws.

Another object of the invention is the provision of roll means comprising first and second rollers located between the opposed lever members of the clinching mechanism for actuating the clinching jaws together for closing the ring, the rollers being in peripheral contact relationship with each other.

Another object of the invention is the provision of roll means in peripheral contact relationship with each other and adapted to roll against opposing cam surface means on the opposed lever members of the clinching mechanism for actuating the clinching jaws together for closing the ring.

Other objects and a fuller understanding of the invention may be had by referring to the following description and claims taken in conjunction with the accompanying drawings in which:

Figure 1 is a side view of a clinching tool embodying the invention with a portion shown in section, the section portion taken along the line 1—1 of Figure 4, the clinching jaws being shown in their maximum open position;

Figure 2 is a view showing only the clinching mechanisms, taken along the line 2—2 of Figure 4, the clinching jaws being shown in their closed position;

Figure 3 is an enlarged cross sectional view taken of the upper jaw in Figure 2 showing the position of the ring therein with the upper jaw in its maximum open position;

Figure 4 is a plan view of the clinching tool with the clinching mechanism being shown in section and taken along the line 4—4 of Figure 1;

Figure 5 shows a side view of the clinching mechanism taken along the line 5—5 of Figure 4;

Figure 6 is a cross sectional view of the clinching mechanism taken along the line 6—6 of Figure 4;

Figure 7 is a rear end view of the clinching tool;

Figure 8 is a front end view of the clinching tool;

Figure 9 is a cross sectional and enlarged view taken along the line 9—9 of Figure 5;

Figure 10 is an enlarged perspective view of a lever member of the clinching mechanism;

Figure 11 is a view of a hog ring shown in its initial open position; and

Figure 12 is a view of the hog ring after it is closed by the tool.

The invention comprises generally a power motor 15, a clinching mechanism 16 actuated by the power motor, and a feed magazine 17 adapted to feed said hog rings 18 of Figure 11 to the clinching mechanism where they are subsequently clinched to a closed formation as shown in Figure 12. The hog ring in its initial position is generally C-shaped. When the ring is clinched the ends of the ring overlap each other to form a closed ring.

The power motor 15 may be electric, hydraulic, mechanical, but preferably pneumatic power is used. The motor 15 may be of the same general construction as shown in Patent No. 2,656,539 and may comprise a cylinder having a dividing piston 33 which forms two opposed chambers 32 and 41. The valve for controlling the motor may be operated by a trigger 28 which actuates a valve plunger for selectively controlling the flow of air to and from the opposed chambers 32 and 41. Figure 1 shows the trigger 28 at rest, and in this position, air pressure comes into an air input duct of the handle and flows through the control valve and to the space 32 behind the piston 33, the air in front of the piston in chamber 41 being exhausted through an exhaust duct in the handle. This keeps the piston in the forward feed position as shown in Figure 1. When the trigger is pushed back, air pressure comes into the air input duct to the handle and flows through the control valve and to the chamber 41 in front of the piston. This actuates the piston in the rearward power direction and as the piston is moved rearwardly the air behind the piston in chamber 32 exhausts through the air exhaust duct in the handle.

A forward end of the cylinder for the power motor is provided with an end cap 50 to which are mounted two parallel disposed side plates 51 and 52 which carry the clinching mechanism 16. The side plates 51 and 52 may be connected to the end cap 50 of the cylinder by any suitable means. As illustrated in Figure 4 the side plates 51 and 52 are mounted on opposite sides of a piston rod 46 actuated by the piston 33. As shown in Figures 1, 2, 3, 4 and 11 the clinching mechanism comprises two opposed lever members 60 and 61 which are substantially identical but reverse to each other. Each lever member comprises a clinching end portion 64, a power end portion 65 and an intermediate portion 66. The intermediate portion of the lever members 60 is pivotally connected between the two supporting side plates 51 and 52 by means of a pivot pin 62. Similarly, the intermediate portion of the lever member 61 is connected between the two side plates 51 and 52 by a pivot pin 63. The clinching end portion 64 of the lever members terminate in clinching jaws 67 having opposed clinching grooves 68 for closing the hog ring. The clinching grooves 68 are somewhat helical so that the open ends of the ring may pass each other as the ring is being closed. The power end portion 65 of the lever members terminate in stop means 69 to limit the opening of the clinching jaws 67 to a maximum position. The stop means comprise an arcuate surface 78 which partially sets around the piston rod 46. In other words, when the arcuate surface 78 of the opposed levers engage the piston rod this engagement constitutes a maximum limit to which the clinching jaws 67 may be opened.

The clinching end portion 64 of the lever members 60 and 61 have opposed converging guide grooves 70 in longitudinal alignment with the clinching grooves 68. The opposed converging guide grooves 70 and the opposed clinching grooves 68 lie in substantially the same plane. The guide grooves 70 have an entrance portion 71 adjacent the feed magazine 17 to receive a ring from the magazine. The guide grooves 70 converge to a discharge portion 72 constituting a discharge path through which the rings pass prior to entering the clinching grooves 68 of the clinching jaws 67. As shown in Fig. 1, the guide grooves 70, at the discharge portion 72 with the clinching jaws open to their maximum position, have a space therebetween less than the initial length of the rings to give the rings a partial closing prior to discharging same into the clinching grooves 68. The space between the opposed clinching grooves 68 is slightly greater than that of the guide grooves 70 at discharge portion 72 by an amount of a few thousandths of an inch whereby the clinching grooves 68 and the guide grooves 70 at the discharge portion 72 define juncture shoulder means 73, see Figure 3. The juncture shoulder means 73 keeps the ring after it is delivered to the clinching grooves 68 from moving back into the guide grooves 70 at the discharge portion 72.

Disposed in alignment with the guide grooves and adapted to move therein is a reciprocable member 74 which is actuated in a forward feed direction and in a rearward power direction by the piston rod 46. The reciprocable member 74 terminates in pusher abutment surfaces 75 which are adapted to push a ring from the entrance portion 71 of the guide grooves 70 through the discharge portion 72 upon actuation of the reciprocable member 74 in a forward feed direction. This pushing action gives a ring a partial closing prior to discharging the ring into the clinching grooves. As the partially closed ring enters the clinching grooves, it expands slightly due to its normal resiliency so that the juncture shoulder means 73 keeps the ring from moving back into the discharge portion 72. In actual practice, the width between the opposed clinching grooves of the clinching jaws 67 may be approximately from .005 inch to .020 inch larger than the space between the opposed guide grooves 70 at the discharge portion 72. The range from .005 inch to .020 inch may be defined as a few thousandths of an inch. As shown in Figures 1 to 5, a back-up anvil 80 is mounted alongside of the discharge portion 72 of the guide grooves 70. Resilient means in a form of a leaf spring 81 may be employed to laterally urge the anvil member 80 into the discharge path of a ring moving in the discharge portion 72 of the guide grooves 70. The rear of the back-up anvil 80 is provided with cam surface 82 and is engageable by a ring as it passes through the discharge portion 72 whereby the anvil member 80 is pushed laterally to one side of the discharge path to admit the ring into the clinching grooves 68. Subsequent to the passage of the ring, the resilient means 81 laterally moves the anvil back into the discharge path and constitute a back-up support to the ring as it is being closed by the clinching jaws.

The back-up anvil 80 is adapted to rock or be pivotally connected to the end of the supporting plate 52 by means of a pin 84 which loosely fits into an opening 85 in the end of the supporting plate 52. The bottom of the pin 84 is securely fastened to the back-up anvil 80 such as by brazing or other means. As illustrated in Figure 4, the back-up anvil has a stepped shoulder 83 into which the end of the supporting plate 52 fits. The leaf spring 81 has its left-hand end fastened under the cap nuts on the pivot pins about which the opposed lever members operate. The right-hand end of the leaf spring is free to swing and is disposed to resiliently urge the back-up anvil into the discharge path of a moving ring. The leaf spring 81 has a hole therein through which the pin 84 extends. The upper end of the pin 84 has a groove into which a split snap ring 76 fits, the ring being on top of the leaf spring 81. When a hog ring engages the cam surface means 82 on the back side of the back-up anvil, the back-up anvil hinges or rocks about the stepped shoulder 83 at the point where it engages the end of the supporting plate 52.

The power end portion 65 of the lever members is adapted to be spread apart by roll means 88. In actual practice the roll means comprises a set of rolls pivotally mounted on opposite sides of the reciprocable member 74. A first set of roll means is shown in Figure 1 and comprises rollers 89 and 90 which make peripheral contact with each other. On the opposite side of the reciprocable member is a second set of rolls, see Figure 6, and are identified as 91 and 92. In other words, the two sets of roll means are mounted on opposite sides of the reciprocable member 74. The roll means are located between the power end portion 65 of the opposed lever members. As shown in Figure 1, the opposed lever members have inner converging cam surfaces 94 against which the roll means engage upon actuation of the reciprocable member in a rearward power direction. The reciprocable member 74 carries the roll means therewith and forces the roll means against the opposed converging cam surface 94 of the power end portion 65 of the lever members for actuating the clinching jaws together for closing the ring.

The feed magazine 17 may be of the same general type as the feed magazine in Patent No. 2,656,539 and comprises a channel member 21 having end turn flanges. The channel member constitutes a feed support for a plurality of rings which are disposed around the outside of the channel member 21. Any suitable means may be employed to feed the rings on to the channel member 21 and as shown in Figures 1 and 4 of the drawings, the rings are inserted on the left-hand end of the channel member 21 by depressing the latches 22 so that the rings may pass over the nibs 23 which ordinarily extend beyond the sides of the channel member 21. The latches 22 are normally biased outwardly by a spring 24. In mounting a ring onto the end of the channel member, it is only necessary to press the spring by operating the exposed plunger 19 thereby depressing the nibs 23 so that the rings may pass thereover on to the channel member 21.

The plurality of rings on the channel member 21 may be urged forwardly towards the clinching mechanism 16 by means of a follower 25 which is urged against the last ring by means of a clock-spring 26. The left-hand end of the clock-spring 26 which is in the form of a ribbon 27 is fastened to the follower 25. The object of a clock-spring is to provide a reasonable constant feed pressure on the rings throughout a long extended travel of the follower 25. As illustrated, the follower 25 is slidably mounted on a guide track 20 which extends substantially parallel to the channel member 21. The rearward end portion of the channel member 21 may be mounted to the power motor by any suitable means such as by a bracket 29 which has one end secured to the power motor and which has the other end secured to the inside of the channel member. The discharge end of the channel member may be suitably mounted to the side of the clinching mechanism 16. The clock-spring 26 is mounted in a housing 31 which may be suitably mounted to the side of the clinching mechanism. The forward end of the guide track 20 may be secured to the housing 31 and the rearward end portion of the guide track may be suitably secured to the power motor such as by a screw 47.

As shown in Figure 4, the channel member 21 of the feed magazine may be fastened to the side plate 51 by means of a magazine plug 30 into which two opposed screws 34 and 35 are mounted, see Figure 4. The upper end 95 of the plug 30 is disposed to rest against the side of the reciprocable member 74 and has its upper left-hand corner 93 chamfered to provide a cam surface against which a ring engages as it is pushed by the reciprocable member 74. The lower end 96 of the magazine plug is adapted to be secured to the end of the channel member 21. The magazine plug has an intermediate opening 42 between the upper and lower ends 95 and 96, see Figure 5, into which a tongue 44 of a mounting plate 36 extends. The mounting plate 36 is held against the side of the supporting side plate 51 by the head of the pivot means which support the opposed levers 60 and 61. A spring 48 is disposed between the tongue 44 and the upper screw 34. The spring 48 urges the upper end 95 of the magazine plug against the side of the reciprocable member. The two screws 34 and 35 may be provided with end sockets so that they may be adjustably turned by a socket tool within the magazine plug to adjust the mounting position of the magazine plug 30. The socket tool has access to the upper screw 34 through aligned openings 97 and 98 of clinching tool and has access to the lower screw 35 through the open side of the channel 21. The arrangement is such that the magazine plug 30 is slightly resiliently and pivotally mounted to the supporting side plate 51. As the reciprocable plunger 74 pushes a ring off the end of the magazine plug 30, the plug under the compression of the spring 48 slightly moves away from the lever members as the ring passes thereunder. After the ring is pushed into the converging opposed guide grooves 70, the magazine plug 30 rides on the side of the reciprocable member 74.

In operation, let it be assumed that the trigger 28 is at rest and that air under pressure is delivered to the chamber 32 of the power motor in which case the piston 33 is moved to the right, which is the end of the forward feed stroke of the reciprocable member 74. This is in the position shown in Figure 1 of the drawing. A ring is in the clinching jaws 67 and is ready to be clinched. The back-up anvil 80 is in the rear of the ring in a position to back up the ring as it is clinched.

The clinching operation is effected by pulling the trigger 28 which delivers air under pressure to the chamber 41 of the air motor and which moves the piston 33 to the left which is designated as the rearward power stroke. Upon the movement of the piston to the left, the sets of rollers engage the converging cam surfaces 94 on the inner side of the power end portion 65 of the opposed lever members 60 and 61. This rearward movement of the sets of rollers spreads the power end portion 65 of the levers and closes the jaws 67 about the ring for clinching same. As the reciprocable member 74 is moved to the left and clears the end of the feed magazine 17, another ring is urged into the entrance portion 71 of the opposed guide groove 70, see Figure 2. Upon release of the trigger 28 the piston 33 moves to the right, which is designated as the forward feed stroke and the pusher abutment surfaces 75 on the end of the reciprocable member 74 push the ring into the converging opposed guide grooves 70 to give the ring a partial closing before it is delivered to the clinching grooves 68 in the jaws 67. Also, as the reciprocable member 74 moves to the right, the sets of rollers move therewith and permits the arcuate surfaces 78, constituting the stop means 69, to engage the piston rod 46 to limit the maximum opening of the jaws 67. As the ring enters the clinching grooves 68 the ring resiliently expands and lodges behind the juncture shoulder means 73, which keeps the ring from sliding back into the opposed guide groove 70 at the discharge portion 72. While the ring is passing through the discharge path at the discharge portion 72, the ring engages the cam surface means 82 and pushes the back-up anvil 80 laterally to one side of the discharge path of the ring moving in the discharge portion. Subsequent to the passage of the ring, the back-up anvil moves back into the discharge path as shown in Figure 3. The anvil 80 fits in a slot 79 at the end of the reciprocable member 74. Also, the lever members having a portion 87 removed, see Figure 10, to provide space for the anvil 80. The ring now is in position to be clinched and this may be done by pulling the trigger to start another cycle of operation.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a tool for clinching hog rings the combination of first and second side plates, first and second opposed ring clinching members pivotally mounted by said first and second side plates for movement between open and closed positions, wall means in said clinching members defining converging ring guide grooves having a discharge portion, clinching grooves continuing from said discharge portion, juncture shoulder means formed at the intersection of said discharge portion and said clinching grooves, the distance between said clinching grooves being slightly greater than the distance between said juncture shoulder means, said grooves defining a path of travel for said rings, said guide grooves and said clinching grooves lying substantially in the same plane, a single back-up anvil pivotally secured to said first side plate and having a portion movable into and out of said path of travel, said portion being located substantially midway between said guide grooves in said opposed members at said discharge portion, a spring member urging said back-up anvil into said path of travel, said back-up anvil having a cam surface, a push member for moving rings through said guide grooves and into said clinching grooves, said push member having a recessed portion for avoiding said back-up anvil, said rings adapted to engage said cam surface of said back-up anvil in traveling through said path to move said anvil out of said path and permit passage of said rings to said clinching grooves.

2. In a tool for clinching rings the combination of first and second side plates, first and second opposed ring clinching members pivotally mounted by said first and second side plates for movement between open and closed positions, wall means in said clinching members defining ring guide grooves terminating in clinching grooves, said grooves defining a path of travel for said rings, said ring guide grooves and said clinching grooves lying substantially in the same plane, a back-up anvil secured to said first side plate and having a portion movable into and out of said path of travel, said portion being located substantially between said grooves in said opposed members, spring means urging said back-up anvil into said path of travel, a push member for moving rings through said guide grooves and into said clinching grooves, said rings adapted to engage said back-up anvil in traveling through said path to move said anvil out of said path and permit passage of said rings to said clinching grooves.

3. In a tool for clinching rings the combination of side plate means, first and second opposed and pivotally mounted ring clinching members movable between open and closed positions, wall means in said clinching members defining ring guide grooves which terminate in clinching grooves, said grooves defining a path of travel for said rings, said guide grooves and said clinching grooves lying substantially in the same plane, a back-up anvil secured to said side plate means and having a portion movable into and out of said path of travel, said portion being located intermediate said grooves in said opposed members, means urging said back-up anvil into said path of travel, a push member for moving rings through said guide grooves and into said clinching grooves, said rings adapted to engage said back-up anvil in traveling through said path to move said anvil out of said path and permit passage of said rings to said clinching grooves.

4. In a tool for clinching rings the combination of side plate means, first and second opposed and pivotally mounted ring clinching members movable between open and closed positions, wall means in said clinching members defining ring guide grooves which terminate in clinching grooves, said grooves defining a path of travel for said rings, said guide grooves and said clinching grooves lying substantially in the same plane, a back-up anvil secured to said side plate means and having a portion movable into and out of said path of travel, said portion being located intermediate said grooves in said opposed members, spring means urging said back-up anvil into said path of travel, a push member for moving rings through said guide grooves and into said clinching grooves.

5. In a tool for clinching rings the combination of side plate means, first and second ring clinching members pivotally mounted by said side plate means for movement between open and closed positions, wall means in said clinching members defining ring guide grooves which terminate in clinching grooves, juncture shoulder means between said ring guide grooves and said clinching grooves, the distance between said clinching grooves being slightly greater than the distance between said juncture shoulder means, said grooves defining a path of travel for said rings, said guide grooves and said clinching grooves lying substantially in the same plane, a back-up anvil secured to said side plate means and having a portion movable into and out of said path of travel, said portion being located intermediate said grooves in said opposed members, spring means urging said back-up anvil into said path of travel, a push member for moving rings through said guide grooves and into said clinching grooves, said rings adapted to engage said back-up anvil in traveling through said path to move said anvil out of said path and permit passage of said rings to said clinching grooves.

References Cited in the file of this patent

UNITED STATES PATENTS

| | | |
|---|---|---|
| 2,656,539 | Chilton | Oct. 27, 1953 |
| 2,689,955 | Garcia | Sept. 28, 1954 |